US010974998B2

(12) United States Patent
Ledoux et al.

(10) Patent No.: US 10,974,998 B2
(45) Date of Patent: *Apr. 13, 2021

(54) METHOD FOR THE MANUFACTURE OF A UREA-BASED PARTICULATE MATERIAL CONTAINING ELEMENTAL SULPHUR

(71) Applicant: Yara International ASA, Oslo (NO)

(72) Inventors: Francois Ledoux, Cormeilles en Parisis (FR); Filip Colpaert, Zwijnaarde (BE)

(73) Assignee: Yara International ASA, Oslo (NO)

(*) Notice: Subject to any disclaimer, the term of this patent is extended or adjusted under 35 U.S.C. 154(b) by 0 days.

This patent is subject to a terminal disclaimer.

(21) Appl. No.: 16/673,069

(22) Filed: Nov. 4, 2019

(65) Prior Publication Data
US 2020/0062665 A1 Feb. 27, 2020

Related U.S. Application Data

(63) Continuation of application No. 15/739,197, filed as application No. PCT/EP2016/065713 on Jul. 4, 2016, now Pat. No. 10,501,380.

(30) Foreign Application Priority Data

Jul. 7, 2015 (NO) .................................. 20150886

(51) Int. Cl.
C05C 9/00 (2006.01)
A23K 40/10 (2016.01)
(Continued)

(52) U.S. Cl.
CPC .............. C05C 9/005 (2013.01); A23K 20/10 (2016.05); A23K 20/105 (2016.05); A23K 40/10 (2016.05); B01J 2/16 (2013.01); C05D 9/00 (2013.01)

(58) Field of Classification Search
CPC ....................................................... C05C 9/00
See application file for complete search history.

(56) References Cited

U.S. PATENT DOCUMENTS 3,231,413 A * 1/1966 Berquin ..................... B01J 2/02
427/213
4,217,127 A 8/1980 Kono et al.
(Continued)

FOREIGN PATENT DOCUMENTS

CN 101774868 A 7/2010
DE 10 2007 061408 A1 6/2009
(Continued)

OTHER PUBLICATIONS

PCT International Search Report and Written Opinion dated Oct. 21, 2016 for PCT International Patent Application No. PCT/EP2016/065713, 11 pages.
(Continued)

Primary Examiner — Wayne A Langel
(74) Attorney, Agent, or Firm — Amster, Rothstein & Ebenstein LLP

(57) ABSTRACT

This invention relates to a method for the manufacture of a homogeneous, solid, particulate, urea-based material comprising elemental sulphur. The invention further relates to a homogeneous, solid, particulate urea-based material comprising small elemental sulphur phases in a urea-based base material and formed by an accretion process. The product is in particular suitable as a fertilizer.

16 Claims, 1 Drawing Sheet

(51) Int. Cl.
*A23K 20/10* (2016.01)
*B01J 2/16* (2006.01)
*C05D 9/00* (2006.01)
*A23K 20/105* (2016.01)

(56) References Cited

U.S. PATENT DOCUMENTS

| | | | |
|---|---|---|---|
| 4,330,319 | A | 5/1982 | Bexton et al. |
| 4,343,622 | A | 8/1982 | Bruynseels |
| 4,701,353 | A | 10/1987 | Mutsers et al. |
| 5,213,820 | A | 5/1993 | Uhlemann et al. |
| 5,571,303 | A | 11/1996 | Bexton |
| 5,599,374 | A | 2/1997 | Detrick |
| 6,159,252 | A | 12/2000 | Schutte et al. |
| 6,179,893 | B1 | 1/2001 | Bendix et al. |
| 6,203,730 | B1 | 3/2001 | Honda et al. |
| 10,501,380 | B2 * | 12/2019 | Ledoux .............. A23K 20/105 |
| 2001/0042287 | A1 | 11/2001 | Watanabe et al. |
| 2005/0204792 | A1 * | 9/2005 | Kohnke .............. C05D 9/02 71/28 |
| 2010/0031719 | A1 | 2/2010 | Hero et al. |
| 2010/0288005 | A1 | 11/2010 | Schromm et al. |
| 2011/0077155 | A1 | 3/2011 | Goodwin |
| 2012/0036906 | A1 * | 2/2012 | Pedersen .............. C05D 9/00 71/23 |
| 2013/0316078 | A1 | 11/2013 | Bedetti |

FOREIGN PATENT DOCUMENTS

| | | |
|---|---|---|
| EP | 0 900 589 A1 | 3/1999 |
| EP | 1701798 A1 | 9/2006 |
| EP | 2 489 429 A1 | 8/2012 |
| FR | 2 145 010 A6 | 2/1973 |
| WO | 0187803 A1 | 11/2001 |
| WO | 03/106376 A1 | 12/2003 |
| WO | 2012113473 A1 | 8/2012 |
| WO | 2013/098404 A1 | 7/2013 |
| WO | 2014009326 A1 | 1/2014 |
| WO | 2015104296 A1 | 7/2015 |
| WO | 2016016150 A1 | 2/2016 |

OTHER PUBLICATIONS

PCT Preliminary Report on Patentability dated Oct. 16, 2016 for PCT International Patent Application No. PCT/EP2016/065713, 17 pages.
PCT Written Opinion dated Jun. 9, 2017 for PCT International Patent Application No. PCT/EP2016/065713, 9 pages.
Bertin, D.E. et al., Dynamics of an Industrial Fluidized-Bed Granulator for Urea Production. Ind. Eng. Chem. Res. 2010, 49: 317-326.
Perrys, Chemical Engineering Handbook (ch.20) (excerpt), 1997, 4 pages.
Kirk-Othmer, Encyclopedia of Chemical Technology, 4th edition, vol. 11, Jun. 27, 1994, p. 138-170.
Maynard DG, Sulfur in the Environment, 1998, p. 113.
Ayub et al, Analysis of the surface quality of Sulphur-coated urea particles in a two-dimensional spouted bed, Braz. J. Chem. Engin. (Mar. 2001), vol. 18, No. 1, 9 pages.

* cited by examiner

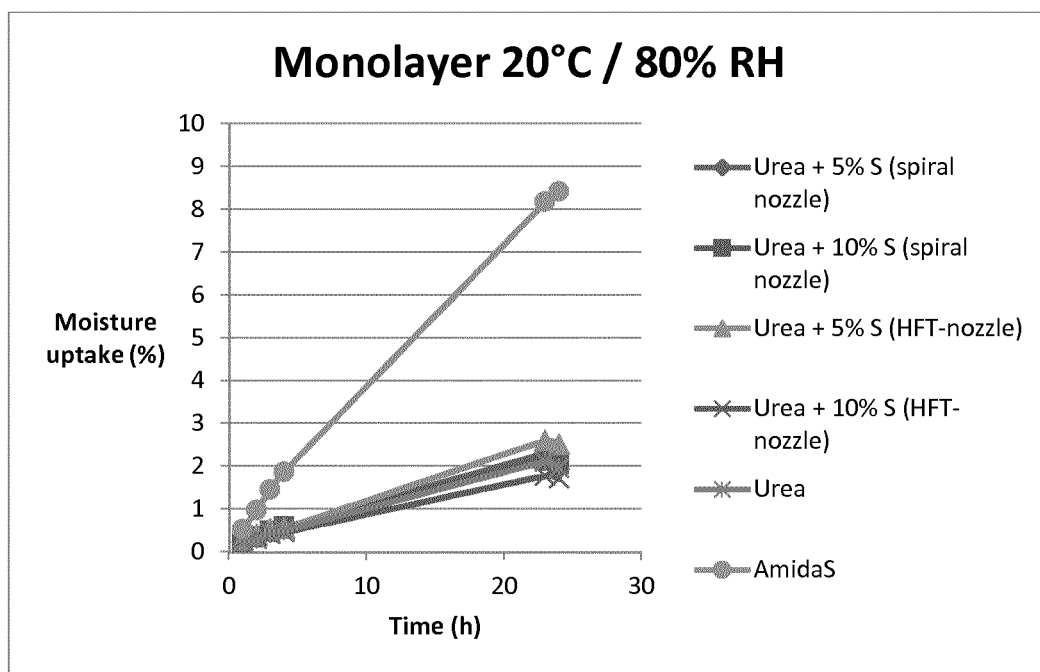

METHOD FOR THE MANUFACTURE OF A UREA-BASED PARTICULATE MATERIAL CONTAINING ELEMENTAL SULPHUR

CROSS-REFERENCE TO RELATED APPLICATIONS

This application is continuation of U.S. patent application Ser. No. 15/739,197, filed Dec. 22, 2017, now U.S. Pat. No. 10,501,380 B2, issued Dec. 10, 2019, which is the U.S. national stage entry under 35 U.S.C. § 371 of PCT International Patent Application No. PCT/EP2016/065713, filed Jul. 4, 2016, which claims priority to Norwegian Patent Application No. 20150886, filed Jul. 7, 2015, the contents of which are incorporated herein by reference in their entirety.

SUMMARY OF THE INVENTION

This invention relates to a method for the manufacture of a homogeneous, solid, particulate, urea-based material comprising elemental sulphur. The invention further relates to a homogeneous, solid, particulate urea-based material comprising small elemental sulphur phases in a urea-based base material and formed by an accretion process. The product is in particular suitable as a fertilizer.

BACKGROUND OF THE INVENTION

Sulphur-containing fertilizers are in ever larger demand for compensating sulphur deficiencies in the soil. Conventionally, sulphur has been applied to the soil in the form of elemental sulphur, or as compounds such as ammonium sulphate, ammonium bisulphate, thiosulphates, sulphides or gypsum, or in combination with other fertilizer materials such as urea, for example as a sulphur-coated urea, as disclosed in U.S. Pat. No. 3,903,333 (Tennessee Valley Authority, 1975) and U.S. Pat. No. 5,599,374 (RLC Technologies LLC., 1997).

Sulphur-containing fertilizers, including fertilizers that contain elemental sulphur, are already known for a long time, the first patents on fertilizers containing elemental sulphur being issued more than 50 years ago. A sulphur-containing fertilizer solves the need to provide sulphur as a nutrient to plants. An agronomical benefit for using elemental sulphur is that a fertilizer comprising elemental sulphur can offer a higher nitrogen content in the fertilizer in the presence of a high sulphur concentration, e.g. over 42 weight % of nitrogen (N) over 8 weight % of sulphur (S) in a urea/sulphur fertilizer.

However, in the case of elemental sulphur, as such, it is not biologically available and needs to be converted to sulphates by bacteria in the soil and dissolved into water, available in the soil, in order to be of nutritional value to the plant. Therefore, other solutions have been found, such as the provision of urea-ammonium sulphate (UAS), in which the sulphur source is dissolvable into water and does not need a biological conversion.

Lately, new efforts have been devoted to the manufacture of urea-based fertilizers containing elemental sulphur, manufactured from a melt-mixture of urea-based base material and elemental sulphur.

U.S. Pat. No. 3,100,698 (Shell, 1963) discloses a fertilizer composition consisting essentially of co-melted and prilled urea and elemental sulphur. It is manufactured by mixing a liquid flow of fertilizer at a temperature of 141° C. and a liquid flow of elemental sulphur at a temperature of 127 to 142° C. using a pump, and it is prilled using a fan spray atomizing nozzle in a classical prilling tower. Vigorous stirring is necessary to avoid phase separation. Instead of employing a prilling tower, the product may be made by other techniques such as by granulating, spherodizing or flaking. The main disadvantage of the sulphur-urea product made according to this method is that the elemental sulphur does not oxidize rapidly enough to provide nutrient sulphur that is available early in the growing season and the sulphur becoming available only in the later stages of plant growth.

U.S. Pat. No. 4,330,319 (Cominco Ltd, 1982) discloses a process for making a urea-based fertilizer comprising elemental sulphur by mixing molten urea and molten elemental sulphur to obtain a molten mixture and solidifying the molten mixture to obtain a particulate urea-based fertilizer comprising elemental sulphur, passing the molten urea and the molten elemental sulphur through a mixing device (static mixer) at a temperature above the melting points of the urea and elemental sulphur in relative amounts, sufficient to produce said urea-based fertilizer comprising elemental sulphur, maintaining a pressure drop across said mixing device of at least about 200 kPa to form a homogenized melt of urea and elemental sulphur, and solidifying said homogenized melt in an inclined rotating granulation drum to obtain a homogeneous, solid, particulate urea-based fertilizer comprising elemental sulphur wherein the elemental sulphur phases have a size of smaller than about 100 µm. Essential in this process is the provision of a homogeneous melt by the use of a mixing tube with a "T" shape for joining the molten elemental sulphur flow with the molten urea flow, a melt that is subsequently homogenized in a mixer, then solidified into solid particles by a rotating drum. It is further disclosed that any one of a number of other methods can also be used, including prilling using a cooling gas in a tower, an inclined rotating pan or a fluidized bed.

It was found that a small elemental sulphur phase size was favourable for an efficient bacterial conversion into sulphates and that the phase size should be equal to or smaller than 100 µm, preferably equal to or smaller than 20 µm, for the bacterial conversion into sulphates to be fast. Hence, research has been performed to minimize the size of the elemental sulphur phases within the urea fertilizer particles by adding a surfactant.

WO03/106376 (Norsk Hydro, 2003) discloses the use of an additive, preferably a $C_6$-$C_{30}$ straight chain fatty acid, such as myristic acid, being temperature stable and amphoteric, to obtain a homogeneous mixed phase.

WO2014/009326 (Shell, 2014) discloses mixing a first flow comprising a liquid fertilizer with a second flow comprising liquid elemental sulphur in a mixing device in the presence of a multifunctional ionic surfactant to form an emulsion comprising elemental sulphur particles which are coated with a layer of the surfactant and dispersed in a fertilizer material that can be solidified.

ReSulf® is an example of a commercial product, sold by Yara International ASA, being a particulate urea-based fertilizer comprising small phases of elemental sulphur with a 42-9S composition, and produced from a micro-emulsified elemental sulphur in a liquid urea basis using a surfactant and solidified using a classical prilling technique.

Not only prills, but also pastilles of a urea-based fertilizer comprising elemental sulphur were produced by Yara International ASA (Oslo, Norway) with a 42-9S composition using a cooling belt (Sandvik, Stockholm, Sweden and in Nitrogen+Syngas 313, September-October 2011).

It would be advantageous to have an elemental sulphur-containing particulate urea-based fertilizer which not only has a high nutrient content and a rich N:S ratio from an agronomical point of view, but also contains elemental sulphur in a form and with a particle size that is more readily and quickly available as a plant nutrient. Such a fertilizer can be applied and can be effective early in the growing season or at other times.

All of the known methods to solve the aforementioned problem focus on the use of a homogenous mixed melt and/or the use of a surfactant to minimize elemental sulphur phase size.

STATEMENT OF THE INVENTION

Surprisingly, the inventors now found a method that obviates both the use of an additive, in particular a surfactant, that improves the homogeneity of the melt of molten urea-based base material and molten elemental sulphur, and/or decreases the average particle size of the elemental sulphur phase therein (compared to a melt of molten urea-based base material and molten elemental sulphur that does not comprise such additive), and the use of a homogenously mixed melt, but still produces particles, in which the elemental sulphur phases have an average size of smaller than about 100 µm, which is about the maximum size over which the elemental sulphur becomes too slowly available for the plants. The use of a surfactant complicates the prior art procedures and adds compounds to the fertilizer that are not desired on the field and have no agricultural value. The use of a mixing device increases residence time in the system (pies, mixing device, pumps, etc.), which should be kept minimal, i.e. a few seconds rather than minutes, in order to minimize decomposition of a urea melt, in particular into biuret and ammonia according to the reaction 2 $CO(NH_2)_2 =>$ biuret$+NH_3$.

The method according to the invention is based on the use of a urea fluidized-bed granulator in which liquid urea-based material and elemental sulphur are mixed, sprayed through one or more spraying means comprising at least one nozzle and solidified into particles.

An advantage of the method according to the invention is that it can be implemented in a common urea plant that uses the aforementioned fluidized bed granulation technology without substantial process modifications or the integration of further equipment, such as a melt mixer, and without the need for the addition of additives, such as surfactants, in particular ionic surfactants, that improve the homogeneity of the melt of molten urea-based base material and molten elemental sulphur, and/or decrease the particle size of the elemental sulphur phase therein.

In its broadest concept, the invention is concerned with a method for the manufacture of a homogeneous, solid, particulate, urea-based material comprising elemental sulphur, the method comprising the steps of:
  (i) providing a melt of molten urea-based material and molten elemental sulphur; and
  (ii) spraying the melt in a urea fluidized bed granulator using spraying means such that the melt is solidified into a homogeneous, solid, particulate urea-based material comprising solid elemental sulphur phases therein.

According to one embodiment, the invention is concerned with a method for the manufacture of a homogeneous, solid, particulate, urea-based material comprising elemental sulphur, the method comprising the consecutive steps of:
  (a) providing a first liquid flow comprising a urea-based base material at a first temperature at least at or above the melting temperature of the urea-based base material;
  (b) providing a second liquid flow comprising elemental sulphur at a second temperature at least at or above the melting temperature of the elemental sulphur;
  (c) continuously joining the first flow with the second flow at a third temperature, at which both flows are liquid, such that elemental sulphur in the resulting melt is in liquid form;
  (d) spraying the resulting melt in a urea fluidized bed granulator using spraying means such that the melt is solidified into a homogeneous, solid, particulate urea-based material comprising solid elemental sulphur phases therein.

In a particular embodiment, the method as described herein is provided with the proviso that no homogeneity improving additives and/or particle size decreasing additives are added in the method. As mentioned herein "homogeneity improving additives" refer to additives such as surfactants and in particular ionic surfactants, that improve the homogeneity of the melt of molten urea-based base material and molten elemental sulphur. As mentioned herein "particle size decreasing additives" refer to additives such as surfactants and in particular ionic surfactants, that decrease the particle size of the elemental sulphur phase therein.

In a further embodiment, the invention is also concerned with a homogeneous, solid, particulate urea-based material comprising elemental sulphur comprising elemental sulphur phases in a urea-based base material and formed by an accretion process, wherein said elemental sulphur phases have very small sizes in the order of 10 µm or less, and preferably manufactured according to the method according to the invention.

In a particular embodiment, the homogeneous, solid, particulate urea-based material as described herein is provided with the proviso that said material comprises no homogeneity improving additives and/or particle size decreasing additives.

Said particulate urea-based material may advantageously be used as a fertilizer, in particular for stimulating the growth of agricultural products on a sulphur-deficient soil.

Said particulate urea-based material may advantageously also be used as an animal feed.

Within the context of this invention, although in the literature, the nature of the elemental sulphur phase is always referred to as particle or droplet, in the context of this invention, the elemental sulphur phase is mostly referred to as a phase that may have a number of shapes, being irregular, droplet-like, flake-like, needle-like, etc.

The invention is not limited to urea-based fertilizers but can also be used for alternate products where elemental sulphur would be beneficially added to urea. For example, the homogeneous, solid, particulate urea-based material of the present invention could be used as an animal feed.

In a further embodiment, the invention is also concerned with the use of a fluidized-bed granulator, equipped with spraying means, for the production of a urea-based material which comprises small elemental sulphur phases, preferably wherein elemental said elemental sulphur phases have a size, determined by laser diffraction analysis and expressed as d90 of smaller than about 20 µm, or expressed as d50 of smaller than about 10 µm, or expressed as d10 of smaller than about 5 µm.

BRIEF DESCRIPTION OF THE DRAWINGS

FIG. 1. Moisture uptake of urea preparations measured over time using monolayer analysis at 20° C., 80% relative humidity (RH).

DETAILED DESCRIPTION OF THE INVENTION

The method will now be described in more detail.

In the late 1970's, fluidized-bed granulation technology has been introduced into the field of urea production as an alternative to classical methods, such as prilling and drum-granulation. A fluidized bed is formed when a quantity of a solid particulate substance (usually present in a holding vessel) is placed under appropriate conditions to cause a solid/fluid mixture to behave as a fluid. This is usually achieved by the introduction of pressurized fluid through the particulate medium. This results in the medium having many properties and characteristics of normal fluids, such as the ability to free-flow under gravity, or to be pumped using fluid type technologies. The resulting phenomenon is called fluidization. Fluidized beds are used for several purposes, such as fluidized bed reactors (types of chemical reactors), fluid catalytic cracking, fluidized bed combustion, heat or mass transfer or interface modification, such as applying a coating onto solid items, and fluidized bed granulation.

There are many types of fluidized-bed granulation, but for the purposes herein, it is only necessary to discuss in detail fluidized-bed granulation technology which is used to produce urea-based material, in particular urea. Currently, there are essentially three main different processes used: a process that was originally developed by Yara Fertilizer Technology (YFT, Norway) but is now licensed by Uhde Fertilizer Technology (UFT, The Netherlands), a process by Toyo Engineering Corporation (TEC, Japan), and a process by Stamicarbon (The Netherlands). Furthermore, there are some emerging processes, e.g. by UreaCasale (Switzerland) and Green Granulation Technology (GGT, The Netherlands).

All processes function in essentially the same way, in that—with reference to this invention—individual particles of solid urea, optionally comprising elemental sulphur, are maintained in an agitated state by a flow of air, grow by repeatedly being impacted by droplets of a solution or melt of urea, optionally comprising elemental sulphur, which then solidifies on their surface through a combination of evaporation (if water is present) and cooling by the fluidizing air before the particles come into contact with more urea melt, optionally comprising elemental sulphur. This is achieved by ensuring the right turbulence and mixing so that the granules cycle alternatively through a zone where the conditions are favourable to the impactation of droplets, and a zone where the conditions are favourable to the solidification thereof. They are designed to do this without any internal moving parts. The granulation mechanism (accretion process) in fluidized-bed urea granulation processes differ from that of conventional fertilizer granulation processes (agglomeration process), in which small solid particles become stuck together by a liquid phase which then solidifies and cements the small particles together into larger granules. Using the fluidized-bed granulation technology, urea granules, optionally comprising elemental sulphur, thus comprise a number of layers made of accreted solidified droplets, similar to the skins of an onion. All processes are designed to achieve this, but they achieve this in a different way. In the UFT process, the urea particles, optionally comprising elemental sulphur, are maintained in a state of fluidization by a bulk flow of air, blowing through a perforated plate in the bottom of the granulator box. At regular intervals, through the bed, the urea melt, optionally comprising elemental sulphur, is atomised in a series of spraying means, comprising nozzles surrounded by atomisation air, discharging vertically upwards. These jets serve the dual purpose of both spraying droplets of liquid urea on the particles and promoting circulation in the fluidized bed, such that the particles are sucked in and entrained in the air flow, where they acquire layers of urea melt, optionally comprising elemental sulphur, then pass into a part of the bed where they only encounter fluidized air, which serves to dry, cool and solidify their most recently acquired layer before they are entrained by the next jet along. The TEC technology uses a spouting or ebullating bed. It does not use atomisation nozzles as such, instead, the urea melt, optionally comprising elemental sulphur, issuing from jets in the bottom of the bed is broken up by high-velocity secondary air, introduced around them. This also lifts entrained particles above the top surface of the surrounding fluidized bed. The Stamicarbon process does not use atomizing nozzles either; the particles acquire their coating of urea, optionally comprising elemental sulphur, by a different mechanism, in which they pass through a film of urea melt, optionally comprising elemental sulphur, created by an annular nozzle around a secondary air jet. All three processes produce granules between about 2 and 8 mm (for more information: see "Fair wind for FB Technology," pp. 40-47, Nitrogen+Syngas 282, July-August 2006). The UreaCasale technology is based on a vortex-type granulator, which is basically a floating fluidized bed, wherein the particles are fluidized with air fed, from the bottom through a grid, such that the particles have a longitudinal and a circular motion. The urea melt, optionally comprising elemental sulphur, is sprayed from the side into the rotating fluidized bed by special spraying means, comprising nozzles, wherein a small amount of air is injected into the nozzle, such that an emulsion of air in the melt is formed.

Notwithstanding to the above mentioned processes, the invention is not limited to these processes, but comprises all processes where particles are substantially formed by accretion. Essential to the invention is that the formation of the particles is done substantially by the action of accretion, not agglomeration. The inventors have now found that this technology can be used to manufacture a homogeneous, solid, particulate, urea-based material comprising elemental sulphur phases which have an average size of smaller than about 100 µm, in particular smaller than about 20 µm, in particular smaller than about 10 µm, in particular smaller than about 5 µm. Without being bound by theory, it is believed (and will be shown later) that the accretion mechanism generates fine elemental sulphur phases within the urea-based particle with an average size of about 100 µm or less, preferably with a size of smaller than 50 µm or less, more preferably with a size of smaller than 25 µm or less, most preferably with a size of smaller than 10 µm or less and even more preferably with a size of smaller than 5 µm, such that an elemental sulphur phase of this small size can be readily oxidized to provide nutrient sulphur for the plants when applied to the soil.

In its broadest concept, there is provided a method for the manufacture of a homogeneous, solid, particulate, urea-based material comprising elemental sulphur, the method comprising the steps of:
(i) providing a melt of molten urea-based base material and elemental sulphur; and
(ii) spraying the melt in a urea fluidized bed granulator using spraying means such that the melt is solidified into homogeneous, solid, particulate urea-based base material comprising solid elemental sulphur phases therein.

The above method can be implemented as a batch process or as a continuous process. In the batch process, the mixture of molten urea-based base material and elemental sulphur is provided at a temperature in the range of about 120° C. to 150° C. The mixture may be advantageously be composed by adding elemental sulphur, for example in powder form, to a melt of base material, optionally in the presence of a small amount of water, such as about 5 to 10 weight % or less, and optionally in the presence of additives, such as anti-caking additives, surfactants, colorants, minor- and trace nutrients, anti-degradation additives, urease-inhibitors, etc.

According to another embodiment, there is provided a method for the manufacture of a homogeneous, solid, particulate, urea-sulphur material comprising elemental sulphur, the method comprising the consecutive steps of:

(a) providing a first liquid flow comprising a urea-based base material at a first temperature at least at or above the melting temperature of the urea-based base material;

(b) providing a second liquid flow comprising elemental sulphur at a second temperature at least at or above the melting temperature of the elemental sulphur;

(c) continuously joining the first flow with the second flow to form a third flow at a third temperature at which both flows are liquid, such that elemental sulphur in the resulting melt is in liquid form;

(d) spraying the resulting melt in a urea fluidized bed granulator using spraying means such that the melt is solidified into homogeneous, solid, particulate urea-based material comprising solid elemental sulphur phases therein.

According to another embodiment, there is provided a method for the production of a homogeneous, solid, particulate, urea-based material comprising elemental sulphur which comprises the steps of providing a first liquid flow comprising a urea-based base material at a first temperature in the range of about 120° C. to 145° C., providing a second liquid flow comprising elemental sulphur at a second temperature in the range of about 120° C. to 150° C., joining the first flow with the second flow at a third temperature in the range of about 120° C. to 150° C., and spraying the resulting melt in a urea fluidized bed granulator using spraying means such that the melt is solidified into a homogeneous, solid, particulate urea-based material comprising solid elemental sulphur phases therein, for example at a temperature of 95° C. to 120° C.

Molten urea-based base material and molten elemental sulphur are obtained from a source of molten urea-based base material and a source of molten elemental sulphur, respectively. Within the context of this invention, molten urea-based base material also comprises an aqueous solution comprising a high concentration of a urea-based base material, such as having a water content of 0.2 to 10 weight %, preferably 3 to 5 weight %. The molten urea-based base material is maintained at a temperature that depends on its water content. Typically, the temperature is about 130° C. and preferably at a temperature in the range of about 120° C. to 145° C. The molten elemental sulphur is also maintained at a temperature above its melting point, usually at a temperature above about 120° C. The molten elemental sulphur is maintained preferably at a temperature in the range of about 120° C. to 150° C. An amount of molten urea-based base material and an amount of molten elemental sulphur from their respective sources are combined in the proportions required to yield the desired grade of material.

The flow rate and pressure of the flow of molten urea-based base material and those of the flow of molten elemental sulphur can be controlled separately and in the relation to each other, as will become apparent, such that the desired quantity of material can be produced, the amount of elemental sulphur sufficient is to obtain the desired grade of material and the elemental sulphur phases in the urea-based material have the desired size. For example, the flows of elemental sulphur/urea-based base material can be joined in a flow ratio which ranges between 0.1:100 and 25:100 by weight, preferably between 1:100 and 15:100 by weight, such that particles are formed that contain from 0.1 to 20 weight % of elemental sulphur, preferably from 1 to 10 weight % of elemental sulphur.

The grades of the homogeneous, solid, particulate, urea-based material comprising elemental sulphur may vary over a broad range. Grades with as little as a few weight % of elemental sulphur, for example a grade with 4 weight % of elemental sulphur (a 43-4S composition) or with as much as about 20 weight % of elemental sulphur (a 37-20S composition) can be manufactured. For most agricultural applications, the N:S weight ratio ranges between 4:1 to 10:1, corresponding to about 5 to 10 weight % of elemental sulphur compared to the total weight of the particles in the case of a urea/sulphur fertilizer.

Since the two flows are physically insoluble with each other, the resulting flow is only a mechanically mixed and inhomogeneous combined flow. The joining of the respective flows may be accomplished by any one of a number of methods. For example, the appropriate amounts of molten elemental sulphur and molten urea-based base material may be supplied to the suction of a suitable pump. The combined amounts of molten elemental sulphur and molten urea-based base material are then passed by the pump directly to the granulator, in particular to the spraying means which comprise at least one nozzle. There is no need for a separate mixing device to obtain a homogenized melt of small molten elemental sulphur phases in molten urea-based base material, as long as the joining of the molten urea-based base material flow and the molten elemental sulphur flow is continuous, i.e. not interrupted for a period long enough to produce a plug of either molten urea-based base material or molten elemental sulphur to produce particles that comprise predominantly of either urea-based base material or elemental sulphur.

Hence, according to one embodiment, a method according to the invention is described wherein the melt of molten urea-based base material and molten elemental sulphur is inhomogeneous. One way of measuring (in)homogeneity at a certain location in the process is by measuring the sulphur content (weight %) or the U/S ratio (weight % of urea/weight % of elemental sulphur) in a number of samples, e.g. sampled from the third flow, and determining the sum of squares of deviations of all data points from their sample mean (DEVSQ) for said S content or U/S ratio (e.g. as defined as the DEVSQ function in Microsoft Excel). Preferably, the DEVSQ of said S content is more than 1, preferably more than 5, in particular between 1 and 30 (determined on at least 5 samples of about 2 gram). Preferably, the DEVSQ of said U/S ratio is more than 1, preferably more than 3, in particular between 1 and 15 (determined on at least 5 samples of about 2 gram).

The method according to the invention produces a homogeneous, solid, particulate, urea-based material comprising elemental sulphur. The homogeneity of said material can be determined in the same way as described above. Preferably, the DEVSQ of the S content of said material is less than 1, preferably less than 0.5 (determined on at least 5 samples of about 2 gram).

In an alternative embodiment, the respective flows may be provided to a mixing device, such as a vessel, provided with agitation, an homogenizer, a static mixer, a mixing pump or a "T"-shaped device as described in U.S. Pat. No. 4,330,319, wherein the combined flows are mixed before the resulting melt is being transferred to the granulator device, in particular the spraying means comprising at least one nozzle.

In order to maintain the desired temperatures and to prevent any premature solidification of molten material, all apparatus that contain molten elemental sulphur and/or urea-based base material can be, for example, steam-traced, internally or externally, or steam-jacketed and/or insulated.

The combined urea-based base material/sulphur melt is subsequently solidified into solid particulates of homogeneous urea-based base material comprising elemental sulphur, wherein the elemental sulphur phase has an average size of smaller than about 100 µm, in particular smaller than about 20 µm, in particular smaller than about 10 µm, in particular smaller than about 5 µm, by passing the combined urea-based base material/sulphur melt to the spraying means comprising at least one nozzle of the urea fluidized bed granulator. The nozzle can be any nozzle that is appropriate for the respective granulator. For example, good results were obtained with a UFT granulator equipped with BETE spiral-type atomization nozzles (BETE Fog Nozzle, Inc., Greenfield, USA) and/or with HFT-type atomization nozzles (EP 1701798 B1, 2005, Yara International ASA) at an operating pressure of about 0.5 bar and a flow rate of about 10 litres/min. Note that such nozzle is operated at a much lower pressure than the nozzles, disclosed in U.S. Pat. No. 4,330,319 (Cominco Ltd, 1982) which nozzles need a pressure drop of at least about 200 kPa (2 bar). The use of a lower pressure is an advantage as less energy is required for spraying the melt.

It is desirable to maintain the residence time of the melt prior to spraying as short as possible. Thus, the time that elapses between the joining step and the melt leaving the spraying means in the fluidized bed granulator should preferably be as short as possible. For example, a residence time of the melt between the steps of joining and spraying in the order of about 10 to 100 seconds or less will ensure that degradation of urea to biuret is minimal.

The solidified particles are subsequently screened and a product of desired particle sizes is recovered. The product is a homogeneous, solid, particulate urea-based material comprising elemental sulphur comprising a uniform dispersion of small elemental sulphur phases in a urea-based base material, wherein the elemental sulphur phases have an average size of smaller than about 100 µm, in particular smaller than about 20 µm, in particular smaller than about 10 µm, in particular smaller than about 5 µm.

To reduce the tendency of caking of the solid urea-based material comprising elemental sulphur, a suitable anti-caking agent may be used, such as formaldehyde. A small amount of a suitable agent may be applied to the solidified particles or to the product size fraction as desired, by coating or spraying. Alternatively and preferably, a suitable anti-caking agent may be added either to the source of molten urea-based base material, the molten mixture of urea-based base material and elemental sulphur, to the flow of molten urea-based base material prior to either the urea pump or the joining of the urea-based base material with the elemental sulphur flow. Typically formaldehyde or urea formaldehyde is added to the urea-based base material melt prior to granulation to serve this purpose and act as a granulating agent.

Optionally, further additives may be added, such as colorants, minor- and trace nutrients, anti-degradation additives, urease-inhibitors, etc.

According to one embodiment, the method according to the invention provides a urea-based material, wherein the urea-based base material is selected from the group of urea, urea-ammonium sulphate, and urea-ammonium phosphate fertilizer.

The preferred embodiments of the method according to the invention will now be illustrated by means of the following non-limitative examples.

EXAMPLES

All experiments were performed on the urea pilot plant in Sluiskil (Yara International ASA). This pilot plant has a batch capacity—after sieving—of about 50 kg of on-spec product. It basically consists of a stirred urea preparation vessel with an active volume of about 150 litres and a fluidized bed granulator of the UFT-type, equipped with a spraying nozzle of the spiral-type or HFT-type (disclosed in EP 1701798 B1, 2005, Yara International ASA).

Analytics

Melt concentration was measured via Karl Fischer analysis on a flake sample taken from the prepared melt in the mixing vessel.

S-content was measured with a LECO type SC 144 DR analyser (LECO, Saint Joseph, Mass., USA) and by weight after filtration.

pH was determined via titration analysis.

The d50 of the granules was determined via sieving or with a Retsch Camsizer Particle Analyzer (Retsch Technology GmbH, Haan, Germany).

PQR caking index was measured with a pneumatic caking machine with 2 bar pressure for 24 hours at 27° C.

PQR crushing index was measured with a small scale up to 10 kg capacity and granules were crushed on the scale with a flat ended steel rod.

PQR abrasion dust was measured with a dust formation apparatus, containing a glass column, two air inlet valves, a glass head, a flow-meter and a gauze with mesh app. 1 mm.

Apparent density was measured with a GeoPyc 1360 pycnometer of Micromeritics (Norcross, Ga., USA).

The particle size distribution of the elemental sulphur phases in the urea granules was measured via laser diffraction analysis and secondly via wind sieve mill analysis. Laser diffraction analysis was done using a Cilas 1180 instrument with wavelengths of 635 and 835 nm (Cilas, Orleans, France). Analysis of the diffraction data was carried out using the Mie-theory, according to ASTM method D4464-10 "Standard Test Method for Particle Size Distribution of Catalytic Material by Laser Light Scattering" with a complex refractive index of 1.9+i0.01.

Sample preparation for laser diffraction analysis: 80 g of granules comprising urea and elemental sulphur phases (also called particles) were dissolved in 500 ml of deionized water at circa 60° C. for 2 hours with stirring. The resulting suspension comprising the solid elemental sulphur particles was filtered and washed with warm deionized water. The thus extracted solid elemental sulphur particles were dispersed in isopropanol (volume of 15 mL) and treated with ultrasonic agitation (probe of 750 W, 20 kHz) for 20 minutes before the laser diffraction analysis was performed. The ultrasonic agitation disagglomerates those solid elemental sulphur particles that are agglomerated in the solution. Without this treatment, slightly higher values for the particle size are obtained.

The total surface area of the extracted solid elemental sulphur particles as a dry elemental sulphur powder was carried out on a Micromeritics 3Flex volumetric adsorption system using the BET method. Krypton was adsorbed at 77K, according to ASTM method D4780—12 "Standard Test Method for Determination of Low Surface Area of Catalysts and Catalyst Carriers by Multipoint Krypton Adsorption".

Assuming either spherical or cubic particle shape, the mean particle size from the surface area was calculated by:

$$\text{Size (m)} = 6/[\text{Density (g·m}^{-3})\cdot\text{Area (m}^2\cdot\text{g}^{-1})]$$

where Size is the diameter of a spherical particle or the edge length of a cubic particle. The density of elemental sulphur is $2.0\times10^6$ g·m$^{-3}$.

Sample preparation for total surface area determination: 80 g of granules comprising urea and elemental sulphur particles were dissolved in 500 ml of deionized water at circa 60° C., for 2 hours with stirring. The resulting solution comprising the solid elemental sulphur particles was filtered and washed with warm deionized water. The extracted solid elemental sulphur particles were dried over-night at 80° C.

Example 1: Urea+5 Weight % S (Spiral Nozzle)

122.14 kg of liquid urea was shortly mixed (not enough to obtain a homogeneous mixture) in a vessel containing a stirrer, with 6.5 kg of elemental sulphur in powder form and 1.36 kg of a urea-formaldehyde conditioning agent, UF80 (from Dynea AS, Lillestrøm, Norway), which is a mixture of urea/formaldehyde/water, in a ratio of 23/57/20) at a temperature of about 129° C. to obtain a melt mix with 5% of elemental sulphur with a melt concentration of 96.2%, after which the resulting melt was pumped to an active fluidized bed granulator at a granulation temperature of about 104° C., equipped with a spiral nozzle. The injection time was about 14 minutes. The particulate urea-based fertilizer comprising elemental sulphur was discharged from the granulator, sieved and cooled to room temperature. A representative sample of the product was analysed to determine the characteristics of the particles. The results are given in Table I and II.

Example 2: Urea+10 Weight % S (Spiral Nozzle)

115.71 kg of liquid urea was mixed (not enough to obtain a homogeneous mixture) in a vessel containing a stirrer, with 13.0 kg of elemental sulphur in powder form and 1.29 kg of a urea-formaldehyde conditioning agent, UF80 (from Dynea AS, Lillestrøm, Norway), which is a mixture of urea/formaldehyde/water in a ratio of 23/57/20) at a temperature of about 130° C. to obtain a melt mix with 10% of elemental sulphur with a melt concentration of 95.2%, after which the resulting mixture was pumped to an active fluidized bed granulator at a granulation temperature of about 101° C., equipped with a spiral nozzle. The injection time was about 13 minutes. The particulate urea-based fertilizer comprising elemental sulphur was discharged from the granulator, sieved and cooled to room temperature. A representative sample of the product was analysed to determine the characteristics of the particles. The results are given in Table I and II.

Example 3: Urea+5 Weight % S (HFT Nozzle)

122.14 kg of liquid urea was mixed (not enough to obtain a homogeneous mixture) in a vessel containing a stirrer, with 6.5 kg of elemental sulphur in powder form and 1.36 kg of a urea-formaldehyde conditioning agent, UF80 (from Dynea AS, Lillestrøm, Norway), which is a mixture of urea/formaldehyde/water in a ratio of 23/57/20) at a temperature of about 130° C. to obtain a melt mix with 5% of elemental sulphur with a melt concentration of 96.3%, after which the resulting mixture was pumped to an active fluidized bed granulator at a granulation temperature of about 108° C., equipped with an HFT nozzle. The injection time was about 13 minutes. The particulate urea-based fertilizer comprising elemental sulphur was discharged from the granulator, sieved and cooled to room temperature. A representative sample of the product was analysed to determine the characteristics of the particles. The results are given in Table I and II.

Example 4: Urea+10 Weight % S (HFT Nozzle)

115.71 kg of liquid urea was mixed (not enough to obtain a homogeneous mixture) in a vessel containing a stirrer, with 13.0 kg of elemental sulphur in powder form and 1.29 kg of a urea-formaldehyde conditioning agent, UF80 (from Dynea AS, Lillestrøm, Norway), which is a mixture of urea/formaldehyde/water in a ratio of 23/57/20) at a temperature of about 130° C. to obtain a melt mix with 10% of elemental sulphur with a melt concentration of 97.4%, after which the resulting mixture was pumped to an active fluidized bed granulator at a granulation temperature of about 108° C., equipped with an HFT nozzle. The injection time was about 13 minutes. The particulate urea-based fertilizer comprising elemental sulphur was discharged from the granulator, sieved and cooled to room temperature. A representative sample of the product was analysed to determine the characteristics of the particles. The results are given in Table I and II.

Example 5: Urea+11 Weight % S (Spiral Nozzle, Injection Air Flow 230 kg/h)

115.93 kg of liquid urea was mixed (not enough to obtain a homogeneous mixture) in a vessel containing a stirrer, with 14.3 kg of elemental sulphur in pastille (3-6 mm) form and 1.28 kg of a urea-formaldehyde conditioning agent, UF80 (from Dynea AS, Lillestrøm, Norway), which is a mixture of urea/formaldehyde/water in a ratio of 23/57/20) at a temperature of about 130° C. to obtain a melt mix with 11% of elemental sulphur with a melt concentration of 95.1%, after which the resulting mixture was pumped to an active fluidized bed granulator at a granulation temperature of about 107° C., equipped with a spiral nozzle. The injection time was about 12 minutes. The particulate urea-based fertilizer comprising elemental sulphur was discharged from the granulator, sieved and cooled to room temperature. A representative sample of the product was analysed to determine the characteristics of the particles. The results are given in Table I and II.

Example 6: Urea+11 Weight % S (Spiral Nozzle, Injection Air Flow 170 kg/h)

115.93 kg of liquid urea was mixed (not enough to obtain a homogeneous mixture) in a vessel containing a stirrer, with 14.3 kg of elemental sulphur in pastille (3-6 mm) form and 1.28 kg of a urea-formaldehyde conditioning agent, UF80 (from Dynea, which is a mixture of urea/formaldehyde/water in a ratio of 23/57/20) at a temperature of about 130° C. to obtain a melt mix with 11% of elemental sulphur with a melt concentration of 95.6%, after which the resulting mixture was pumped to an active fluidized bed granulator at a granulation temperature of about 105° C., equipped with a spiral nozzle. The injection time was about 11 minutes. The particulate urea-based fertilizer comprising elemental sulphur was discharged from the granulator, sieved and cooled to room temperature. A representative sample of the product was analysed to determine the characteristics of the particles. The results are given in Table I and II.

Example 7: Urea+5 Weight % S+10 Weight % AS (Spiral Nozzle, Injection Air Flow 170 kg/h)

110.5 kg of liquid urea was mixed (not enough to obtain a homogeneous mixture) in a vessel containing a stirrer, with 13.0 kg of crystalline ammonium sulphate and 6.5 kg elemental sulphur in pastille (3-6 mm) form and 1.21 kg of a urea-formaldehyde conditioning agent, UF80 (from Dynea AS, Lillestrøm, Norway), which is a mixture of urea/formaldehyde/water in a ratio of 23/57/20) at a temperature of about 130° C. to obtain a melt mix with 5 weight % of elemental sulphur and 10 weight % ammonium sulphate with a melt concentration of 95.7%, after which the resulting mixture was pumped to an active fluidized bed granulator at a granulation temperature of about 105° C., equipped with a spiral nozzle. The injection time was about 12 minutes. The particulate urea-ammonium sulphate fertilizer comprising elemental sulphur was discharged from the granulator, sieved and cooled to room temperature. A representative sample of the product was analysed to determine the characteristics of the particles. The results are given in Table I and II and compared to a typical urea sample, obtained in the same way

TABLE I

Quality analysis

|  | Ex. 1 5% S | Ex. 2 10% S | Ex. 3 5% S | Ex. 4 10% S | Ex. 5 11% S | Ex. 6 11% S | Ex. 7 5% S + 10% AS | Urea |
|---|---|---|---|---|---|---|---|---|
| Nozzle type | Spiral | Spiral | HFT | HFT | Spiral | Spiral | Spiral |  |
| Injection air flow (kg/h) | 230 | 230 | 230 | 230 | 230 | 170 | 230 |  |
| Moisture (%) | 0.17 | 0.20 | 0.12 | 0.12 | 0.18 | 0.21 | 0.17 | 0.15-0.25 |
| S-content (%) | 4.9 | 8.6 [a] | 4.5 | 8.5 [a] | 10.8 | 10.4 | 5.0 | 0 |
| pH | 7.8 | 7.9 | 7.5 | 7.5 | 7.6 | 7.9 | 3.8 | 8.5-9.7 |
| PQR caking index (kgf, at 27° C.) | 20 | 29 | 32 | 38 | — | — | 65 | 20-65 |
| PQR crushing index (kg) | 4.2 | 4.3 | 4.4 | 4.1 | 4.2 | 3.8 | 3.9 | 4.0-4.6 |
| PQR Impact resistance (%) | 0.9 | 0.7 | 0.7 | 0.6 | 1.7 | 0.9 | 0.9 | 0.4-5 |
| PQR abrasion dust formation (mg/kg) | 400 | 1025 | 2250 | 4100 [b] | 400 | 900 | 2100 | 100-200 |
| d50 granules (mm) (mg/kg) | 3.31 | 3.39 | 3.09 | 3.22 | 3.29 | 3.31 | 3.29 | 3.39 |
| Apparent density (g/cm$^3$) | 1.29 | 1.29 | 1.28 | 1.25 | 1.30 | 1.29 | 1.22 | 1.25 |

[a] some loss occurred
[b] possibly due to higher melt concentration and lower moisture level.

TABLE II

S-particle size

|  | Ex. 1 5% S | Ex. 2 10% S | Ex. 3 5% S | Ex. 4 10% S | Ex. 5 11% S | Ex. 6 11% S | Ex. 7 5% S + 10% AS | Typical |
|---|---|---|---|---|---|---|---|---|
| Nozzle type | Spiral | Spiral | HFT | HFT | Spiral | Spiral | Spiral |  |
| Injection air flow (kg/h) | 230 | 230 | 230 | 230 | 230 | 170 | 170 |  |
| Laser diffraction analysis |  |  |  |  |  |  |  |  |
| d10 (μm) | 3.06 | 2.67 | 2.66 | 3.29 | 3.76 | 2.70 | 3.80 | about 5 or lower |
| d50 (μm) | 7.08 | 6.54 | 6.53 | 7.67 | 8.57 | 7.23 | 9.07 | about 10 or lower |
| d90 (μm) | 13.85 | 13.79 | 13.10 | 14.95 | 17.61 | 16.67 | 18.18 | about 20 or lower |
| surface-weighted mean D[3.2] [c] (μm) | 19.7 | 19.2 | 20.4 | ≈20 | — | — | — | about 20 or lower |
| volume-weighted mean D[4.3] [c] (μm) | 28.5 | 30.3 | 41.2 | ≈40 | — | — | — | about 40 or lower |
| Krypton BET |  |  |  |  |  |  |  |  |
| Surface area (m$^2$/g) | 0.617 | 0.471 | 0.633 | 0.405 | 0.419 | 0.419 | 0.339 |  |
| Calculated average particle size (μm) | 4.7 | 6.4 | 4.6 | 7.4 | 7.1 | 6.9 | 8.6 | about 10 or lower |
| Wind sieve mill analysis |  |  |  |  |  |  |  |  |
| <32 μm | 86% | — | — | — | — | — | — | about 90% |
| <20 μm | 70% | — | — | — | — | — | — | about 70% |

[c] these experiments were done without ultrasonic treatment to disagglomerate the particles From these experiments, it can be concluded that the method according to the invention delivers a high quality product, of which the characteristics are comparable to the ones of urea. Selection of the processing conditions should reduce dust formation during production.

Surprisingly, it was found that more than 70% of the S-phases was <20 μm. In particular, the size (d50) of the S-phases was less than 10 μm. This is considerably smaller than the size of the S-particles disclosed in U.S. Pat. No. 4,330,319, where only 5.7% and 7.5% of the S-particles had a particle size diameter of about 20 μm. Via laser diffraction analysis, for all produced urea-based fertilizer comprising elemental sulphur, a d50 was found between 6.5 and 8.2 μm. This matched almost perfectly with the calculated average particle size from the BET surface area, i.e. 5.0 to 7.5 μm. Hence, the method according to the invention does not only provides a more efficient process, it also provides particles with smaller S-phases than the prior art particles. As mentioned, a small elemental sulphur phase size is favourable for an efficient bacterial conversion into sulphates.

Example 8

For all samples, the moisture uptake was measured over time using monolayer analysis at 20° C./80% relative humidity for 24 hours. The results, shown in FIG. 1, show a similar moisture uptake behaviour as regular urea granules.

Example 9

To determine the (in)homogeneity of the smelt and the granules, determined as the DEVSQ (the sum of squares of deviations of data points from their sample mean) of the S-content or Urea/Sulfur ratio, urea/elemental S samples (flakes, about 2 gram) were taken from the melt preparation in the mixing vessel and after circulation, close to the injector in the granulator, for the mixture of Example 5 (11 weight % sulphur) and from the resulting granules (about 2 gram of granules per sample). As can clearly be seen, the melt present in the mixing vessel is very inhomogeneous (high DEVSQ). Once circulated at higher flows with more turbulence, the melt becomes more homogeneous (lower DEVSQ). The final granules are homogeneous (DEVSQ less than 1).

TABLE 3

| Sample (about 2 g) | Elemental Sulphur (weight %) | U/S |
|---|---|---|
| Homogeneity | | |
| Mixing vessel | | |
| 1 | 13.9 | 6.89 |
| 2 | 15.2 | 5.59 |
| 3 | 9.1 | 10.03 |
| 4 | 10.7 | 8.33 |
| 5 | 14.5 | 5.87 |
| Mean | 12.7 | 7.3 |
| Std | 2.64 | 1.8 |
| DEVSQ | 27.9 | 13.6 |
| Injector | | |
| 1 | 13.6 | 6.36 |
| 2 | 11.3 | 7.82 |
| 3 | 10.9 | 8.20 |
| 4 | 11.2 | 7.95 |
| 5 | 10.2 | 8.77 |
| Mean | 11.4 | 7.8 |
| Std | 1.28 | 0.9 |
| DEVSQ | 6.6 | 3.2 |
| Granules | | |
| 1 | 10.4 | — |
| 2 | 10.6 | — |
| 3 | 10.8 | — |
| 4 | 10.4 | — |
| 5 | 10.4 | — |
| 6 | 10.4 | — |
| 7 | 10.6 | — |
| 8 | 10.5 | — |
| 9 | 10.7 | — |
| 10 | 10.7 | — |
| 11 | 10.3 | — |
| 12 | 10.3 | — |
| 13 | 10.6 | — |
| 14 | 10.3 | — |
| Mean | 10.5 | — |
| Std | 0.17 | — |
| DEVSQ | 0.36 | — |

It will be understood that modifications can be made to the embodiments of the invention described and illustrated therein without departing from the scope of the invention as defined in the appended claims.

Furthermore, also the following aspects of the invention are disclosed:

Aspect 1.

A method for the manufacture of a homogeneous, solid, particulate, urea-based material comprising elemental sulphur phases, the method comprising the steps of:
(i) providing a melt of molten urea-based base material and molten elemental sulphur; and
(ii) spraying the melt in a urea fluidized bed granulator using spraying means such that the melt is solidified into a homogeneous, solid, particulate urea-based material.

Aspect 2.

A method for the manufacture of a homogeneous, solid, particulate, urea-sulphur material comprising elemental sulphur phases, the method comprising the consecutive steps of:
(a) providing a first liquid flow comprising a urea-based base material at a first temperature at least at or above the melting temperature of the urea-based base material;
(b) providing a second liquid flow comprising elemental sulphur at a second temperature at least at or above the melting temperature of the elemental sulphur;
(c) continuously joining the first flow with the second flow to form a third flow at a third temperature at which both flows are liquid, such that elemental sulphur in the resulting melt is in liquid form;
(d) spraying the resulting melt in a urea fluidized bed granulator using spraying means such that the melt is solidified into a homogeneous, solid, particulate urea-based material.

Aspect 3.

The method according to any one of aspect 1 to 2, wherein the solidification of the particulate urea-based material is done in the granulator substantially by the action of accretion.

Aspect 4.

The method according to any one of aspects 2 to 3, wherein the first temperature is in the range of about 120° C.

to 145° C., and/or wherein the second temperature is in the range of about 120° C. to 150° C., and/or wherein the third temperature is in the range of about 120° C. to 150° C.

Aspect 5.

The method according to any one of aspects 1 to 4, wherein the step of spraying the resulting melt in a urea fluidized bed granulator using spraying means such that the melt is solidified into a homogeneous, solid, particulate urea-based material in performed at a temperature of 95° C. to 120° C.

Aspect 6.

The method according to any one of aspects 2 to 5, wherein the ratio of second flow to first flow ranges between 0.1:100 and 25:100 by weight, preferably between 1:100 and 15:100 by weight.

Aspect 7.

The method according to any one of aspects 2 to 6, wherein the residence time of the third flow between the steps of joining and spraying is in the order of about 10 to 100 seconds.

Aspect 8.

The method according to any one of aspects 1 to 7, wherein the spraying means comprise at least one atomization nozzle, operated at less than 2 bar, preferable less than 1 bar.

Aspect 9.

The method according to any one of aspects 1 to 8, wherein the sulphur phases in the homogeneous, solid, particulate urea-based material have sizes, expressed as surface-weighed mean D[3.2] of smaller than about 40 µm, preferably smaller than about 30 µm, more preferably smaller than about 20 µm.

Aspect 10.

The method according to any one of aspects 1 to 8, wherein the sulphur phases in the homogeneous, solid, particulate urea-based material sizes, expressed as volume-weighed mean D[4.3] of smaller than about 50 µm, preferably smaller than about 40 µm, more preferably smaller than about 30 µm.

Aspect 11.

The method according to any one of aspects 1 to 10, wherein the urea-based base material is selected from the group of urea, urea-ammonium sulphate, and urea-ammonium phosphate fertilizer.

Aspect 12.

A homogeneous, solid, particulate urea-based material, obtainable by the method according to any one of aspects 1 to 11.

Aspect 13.

A homogeneous, solid, particulate urea-based material, comprising finely divided elemental sulphur phases in a urea-based base material.

Aspect 14.

A homogeneous, solid, particulate urea-based material according to aspect 12 or 13, wherein said sulphur phases have a size, expressed as surface-weighed mean D[3.2] of smaller than about 40 µm, preferably smaller than about 30 µm, more preferably smaller than about 20 µm.

Aspect 15.

A homogeneous, solid, particulate urea-based material according to aspect 12 or 13, wherein said sulphur phases have a size, expressed as volume-weighed mean D[4.3] of smaller than about 50 µm, preferably smaller than about 40 µm, more preferably smaller than about 30 µm.

Aspect 16.

Use of the homogeneous, solid, particulate urea-based material as disclosed in aspects 12 to 15 as a fertilizer.

Aspect 17.

Use of the homogeneous, solid, particulate urea-based material as disclosed in aspects 12 to 15 as for supporting the growth of agricultural products on a sulphur—deficient soil.

Aspect 18.

Use of the homogeneous, solid, particulate urea-based material as disclosed in aspects 12 to 15 as an animal feed.

The invention claimed is:

1. A method for the manufacture of a homogeneous, solid, particulate, urea-based material comprising elemental sulphur, the method comprising the steps of:
   (i) providing a melt of molten urea-based base material and molten elemental sulphur; and
   (ii) spraying the melt in a urea fluidized bed granulator using spraying means, wherein the spraying means comprise at least one atomization nozzle, operated at less than 2 bar, such that the melt is solidified into homogeneous, solid, particulate urea-based material comprising solid elemental sulphur phases therein;
   wherein the solid elemental sulphur phases have a size, determined by laser diffraction analysis and expressed as d90, of smaller than about 20 µm, or expressed as d50, of smaller than about 10 µm, or expressed as d10, of smaller than about 5 µm;
   wherein the solidification of the particulate urea-based material is done in the fluidized bed granulator substantially by the action of accretion.

2. The method according to claim 1, wherein step (i) comprises:
   (a) providing a first liquid flow comprising a urea-based base material at a first temperature at least at or above the melting temperature of the urea-based base material;
   (b) providing a second liquid flow comprising elemental sulphur at a second temperature at least at or above the melting temperature of the elemental sulphur; and
   (c) continuously joining the first flow with the second flow to form a third flow at a third temperature at which both flows are liquid, such that elemental sulphur in the resulting melt of molten urea-based base material and molten elemental sulphur is in liquid form.

3. The method according to claim 1, wherein the melt of molten urea-based base material and molten elemental sulphur is sprayed in the absence of an additive that improves the homogeneity of the melt of molten urea-based base material and molten elemental sulphur, and/or decreases the average particle size of the elemental sulphur phases therein.

4. The method according to claim 1, wherein the melt of molten urea-based base material and molten elemental sulphur is inhomogeneous, wherein the DEVSQ of the S content is more than 1 (determined on at least 5 samples of about 2 gram).

5. The method according to claim 2, wherein the first temperature is in the range of about 120° C. to 145° C., and/or wherein the second temperature is in the range of about 120° C. to 150° C., and/or wherein the third temperature is in the range of about 120° C. to 150° C.

6. The method according to claim 1, wherein the step of spraying the resulting melt in a urea fluidized bed granulator using spraying means such that the melt is solidified into a homogeneous, solid, particulate urea-based material is performed at a temperature of 95° C. to 120° C.

7. The method according to claim 2, wherein the ratio of second flow to first flow ranges between 0.1:100 and 25:100 by weight.

8. The method according to claim 2, wherein the residence time of the third flow between the steps of joining (c) and spraying (ii) is in the order of about 10 to 100 seconds.

9. The method according to claim 1, wherein about 90% of the elemental sulphur phases have a size, determined by wind sieve mill analysis, of smaller than 32 μm.

10. The method according to claim 1, wherein the urea-based base material is selected from the group consisting of urea, urea-ammonium sulphate, and urea-ammonium phosphate fertilizer.

11. The method according to claim 1, wherein the homogeneity, determined as the DEVSQ for the S content of said material is less than 1 (determined on at least 5 samples of about 2 gram).

12. The method according to claim 1, wherein the spraying means comprise at least one atomization nozzle, operated at less than 1 bar.

13. A homogeneous, solid, particulate urea-based material, comprising finely divided elemental sulphur phases in a urea-based base material and formed by an accretion process wherein said elemental sulphur phases have a size, determined by laser diffraction analysis and expressed as d90, of smaller than about 20 μm or expressed as d50, of smaller than about 10 μm or expressed as d10, of smaller than about 5 μm; and wherein the homogeneous, solid, particulate urea-based material does not comprise a surfactant.

14. A homogeneous, solid, particulate urea-based material according to claim 13, wherein about 90% of the elemental sulphur phases have a size, determined by wind sieve mill analysis, of smaller than 32 μm.

15. The homogeneous, solid, particulate urea-based material according to claim 13, wherein the homogeneity, determined as the DEVSQ for the S content of said material is less than 1 (determined on at least 5 samples of about 2 gram).

16. A fertilizer, for supporting the growth of agricultural products on a sulphur-deficient soil, or an animal feed, comprising the homogeneous, solid, particulate urea-based material as claimed in claim 13.

\* \* \* \* \*